United States Patent [19]

Zwicky et al.

[11] 4,170,362
[45] Oct. 9, 1979

[54] BEARING ARRANGEMENT FOR A RECORD PLAYER TONEARM

[75] Inventors: Paul Zwicky, Dielsdorf; Eduard Marthaler, Zürich, both of Switzerland

[73] Assignee: Willi Studer, Switzerland

[21] Appl. No.: 938,643

[22] Filed: Aug. 31, 1978

[30] Foreign Application Priority Data

Sep. 5, 1977 [CH] Switzerland ................ 10770/77

[51] Int. Cl.² .............................................. G11B 3/12
[52] U.S. Cl. ................................. 274/23 A; 274/23 R
[58] Field of Search ........................... 274/23 R, 23 A

[56] References Cited

U.S. PATENT DOCUMENTS

| 3,479,038 | 11/1969 | Eisner ........................ 274/23 A |
| 3,779,563 | 12/1973 | Irisawa ....................... 274/23 R |
| 4,065,188 | 12/1977 | Ridler et al. ............... 274/23 A |

*Primary Examiner*—Charles E. Phillips
*Attorney, Agent, or Firm*—Roylance, Abrams, Berdo & Farley

[57] ABSTRACT

The disclosed arrangement is of the type for a short tonearm which is guided over the record so that the tonearm remains tangential to the grooves of the record. The tonearm is balanced mechanically on a single point bearing, with the phono cartridge to one side and a counterweight to the other side of the bearing. A permanent magnet fixed to the top of the tonearm interacts with a stationary magnet closely spaced from it to hold the tonearm vertically. The tonearm magnet is a vertical, round, solid cylinder section, while the stationary magnet is a parallelepiped with facing width equal to the diameter of the facing tonearm magnet. This constrains the tonearm to prevent it from tipping to the side, while permitting rotation about the vertical axis and about a horizontal axis through the point bearing and perpendicular to the tangent to the record groove.

The improvement comprises that the stationary magnet is provided with a winding. By control of a direct current in the winding, the tonearm can be raised and lowered and the stylus pressure controlled, even while the stylus is tracking in a groove. Futhermore, the tonearm can be magnetically preloaded, so that in the absence of current in the control winding, the tonearm raises to its rest position, thus preventing damage to the record. Various designs are described for determining the interaction of the movable and stationary magnets and the superimposed magnetic field of the control winding.

7 Claims, 2 Drawing Figures

BEARING ARRANGEMENT FOR A RECORD PLAYER TONEARM

BACKGROUND OF THE INVENTION

For the avoidance of tracking errors in record players, there are preferably used arrangements by which the tonearm is always retained along a tangent to the record grooves.

One such arrangement uses a short tonearm which is moved over the record by a guide system so that it is always in a position which corresponds to a groove tangent. An advantageous design of such a short tonearm, in which the permitted and forbidden movements of the tonearm and phono cartridge are determined by magnetic forces, is known and is described, for instance, in the U.S. application Ser. No. 902,217, which was filed May 2, 1978 for the same inventor as in the present application and also entitled BEARING ARRANGEMENT FOR A RECORD PLAYER TONEARM. For achieving a practically friction-free bearing of the tonearm, the vertical positioning of the system is magnetic. The tonearm is supported in a single point thrust bearing and held by means of a permanent magnet, by which also one of the degrees of freedom of movement is suppressed by appropriate dimensioning of stationary and movable magnetic poles which interact.

DESCRIPTION OF THE INVENTION

In accordance with the present invention, the stylus pressure of the tonearm is determined by means of controllable magnetic forces acting on the tonearm in a plane which is tangential to the record grooves and vertical to the record. Arrangements used heretofore have relied on the constant interaction of a first, movable permanent magnetic member fixed to the tonearm with a second, stationary permanent magnet member or a correspondingly dimensioned constant-field soft-magnet member. With such an arrangement pressure on the point thrust bearing is minimized, while a movement of the tonearm about a vertical axis and a lowering of the stylus into the pickup position is made possible. At the same time, a sideways tilting movement is prevented.

In prior arrangements, the stylus force and the raising movement of the tonearm resulted through mechanical means, such as for example by means of a pin arranged parallel to the record surface and forming a support for the tonearm in the resting position. For initiating the lowering movement, the supporting pin was lowered, by which the stylus came into contact with the upper surface of the record. The same movements in the reverse order resulted in a raising of the tonearm.

In order to eliminate the mechanics of solenoids or other movement controls, it is a further feature of the present invention that the forces which being about the raising and lowering of the tonearm arise from the interaction between permanent magnetic fields of constant intensity and controlled variable magnetic fields. In contrast to earlier constructions, there are used not only the interaction between movable and fixed permanent magnet members, but rather at least one of the sources required for the magnetic fields is provided with the additional feature of a controllable electromagnetic influence. In this way, there can be varied not only the intensity of the magnetic fields, but also the direction of the resulting force.

For known designs of tonearms, the setting of the stylus pressure is almost entirely by adjustment of a counterweight, and in rare cases also by variation of a spring force. The instant design for a record player with a short tonearm has, among other characteristics, the advantage of being relatively insensitive to vibrations. The effects of acceleration and deceleration forces are minimized when the movable system, namely the short tonearm with the stylus, is balanced, that is, when the center of gravity is as nearly as possible coincident with the supporting bearing point of the thrust bearing. This conflicts with the possibility of setting the stylus pressure by adjustment of a counterweight, as this would create an imbalance of some significant magnitude.

A means of adjusting the stylus pressure in accordance with the present invention is to create the required force through a controllable electromagnetic effect with respect to a tonearm, which is mechanically balanced at the bearing point. The electromagnetic generation of a directional force requires certain considerations which relate to the safety of operation of the playing apparatus. For example, provision must be made to avoid having the tonearm in the down position when the apparatus is switched off or when the power is lost for other reasons. Provisions are made for this in accordance with the present invention in that the movement of the tonearm for lowering the pickup head in the required direction results from the strengthening of the electromagnetic components of the magnetic fields. If, for some reason, this electrically generated field vanishes, the tonearm raises and settles into its raised position.

For error-free pickup from a record, the stylus pressure must be set at an optimum value. This optimum value depends upon various factors and is commonly set in accordance with recommended values from the manufacturers of the phono cartridge, with the result that in general only seldom is the stylus pressure actually measured with a commercially available measuring device. Besides this, each particular tonearm construction has its own adjustment, which is usually not in agreement with that of other products. In practice, other deviations in phonocartridge characteristics, such as compliance, bring further uncertainties which up to now it has not been possible to take into account at all. The optimum setting is therefore at best a compromise of various, and in part unknown, factors.

When, in accordance with the present invention, the stylus pressure is determined and controlled electromagnetically, then it is possible to precisely provide an error-free control of the stylus pressure which can also be remotely controlled. That is, it can be controlled while the stylus is tracking on a turning record. With this, there is available for the first time the possibility, with the aid or a suitable reference record, of actually adjusting the stylus pressure parameters to their optimum values. It is a further feature of the present invention that the measuring of the optimum stylus pressure by the adjustment of the electromagnetic components of the forces which affect the tonearm can be carried out during playing.

DESCRIPTION OF THE PREFERRED EMBODIMENTS

Figure 1:
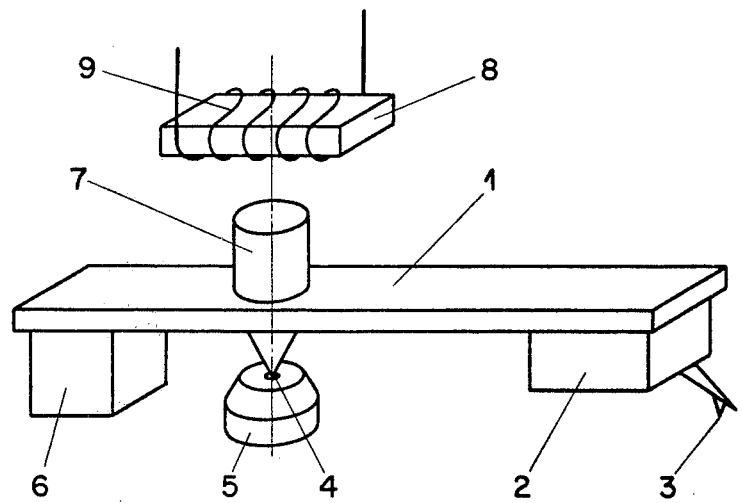
FIG. 1 is a schematic front perspective view of a tonearm and its bearing arrangement in accordance with a preferred embodiment of the present invention.

For a detailed description of the arrangement of FIG. 1, it is useful to start with the short tonearm. On the tonearm 1 there is mounted a phono cartridge 2 with its stylus 3. The mechanical support of the tonearm 1 is by a point bearing consisting of a point 4 which rests in a bearing jewel 5. A fixed counter-weight 6 is provided for the balancing of the tonearm. The upright position of the entire movable system is assured by a cylindrical permanent magnet 7, which interacts through an air gap with a second permanent magnet 8 arranged in a stationary position.

The upper end face of the cylindrical magnet 7 carries a polarity opposite that of the underside of the lengthwise-extending magnet 8. This results in a mutual attraction which holds the movable system in the vertical position with two degrees of freedom for a practically friction-free movement. The first is the pivoting about the vertical axis which intersects the point bearing. The second is the pivoting movement about the bearing point along the lengthwise direction of the fixed magnet, that is, the raising and lowering of the stylus. The second degree of freedom is present because the end face of the permanent magnet 7 will be constrained to move in this direction of a constant magnetic field in the gap. The geometrical dimensioning of the magnets 7, 8 prevents a tilting movement perpendicular to the longitudinal direction of the magnet 8, since the diameter of the movable cylindrical magnet 7 is chosen to be equal to the width of the fixed magnet 8. The fixed opposite pole 8 may also be made of a non-permanent soft-magnetic material, such as soft iron, since the required forces, in this instance with other absolute values, would likewise appear.

A winding 9 is arranged on the fixed magnet 8. When a direct current passes through this winding 9, there is generated a longitudinal magnetic field in addition to, and superimposed on, the vertical magnetic field of the magnet 8. This generates force components which tend to move the movable magnet 7 in one or the other direction longitudinally to the magnet 8. The magnitude of this force is controllable by control of the direct current in the winding 9. Thus, the tonearm can be thereby lowered to or raised from the record. By corresponding adjustment of the current, and therewith the longitudinal field, the stylus pressure can be adjusted. The permanent magnet or soft magnet members for the electromagnetically controlled stationary pole which faces the movable permanent magnet member can be so chosen and dimensioned that the required forces can be achieved with little cost and so that sufficient travel of the tonearm is assured.

If the activating direct current should be shut off, then for safety reasons the stylus must be held raised up from the record. This can be achieved, for example, by appropriate design of the air gap. Between the magnet member 8 and the pole surface of the magnet member 7 there is a symmetrical air gap. If this air gap is asymmetrically designed, such as for example if the magnet 8 is tilted slightly to the left, so that with a movement of the magnet 7 the air gap between the two pole surfaces becomes smaller, then for an interrupted current, the magnet member 7 will be forced to move in the direction of the smaller air gap, by which the tonearm will be lifted from the record.

Figure 2:
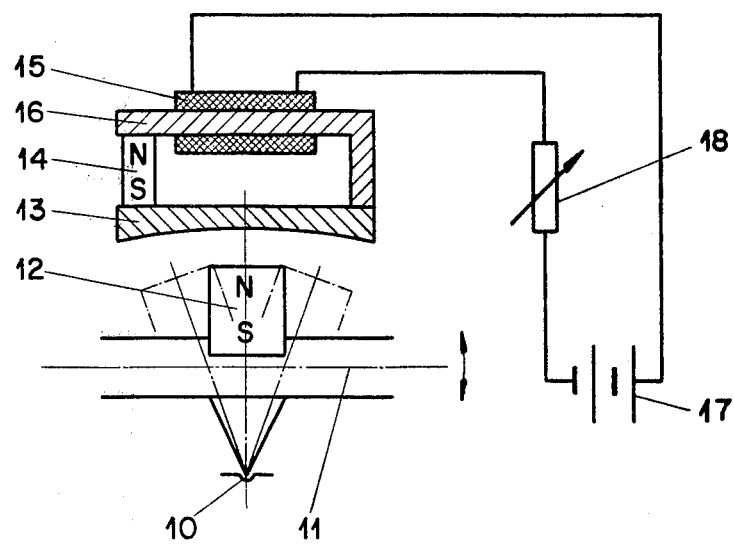
FIG. 2 is a partially sectioned, partially schematic end view of a tonearm and its bearing arrangement in accordance with another embodiment of the present invention.

There is shown in FIG. 2 of the drawings another possible embodiment which is necessary, for example, when the winding of a wire through the air gap between the fixed and the movable magnet is not feasible. In the sectioned drawing, there is again shown a point bearing 10 of the movable system with a tonearm 11 which carries a permanent magnet 12. Opposite the upper pole surface of the magnet 12, there is arranged a fixed magnet circuit assembly which consists of a compound magnet having a pole shoe 13 bridging across a rectangular permanent magnet 14 and an L-channel shaped carrier yoke 16 carrying an activating winding 15. This forms a control system for which various other designs are also possible. The instant principal example was chosen for facilitating a description of the function. The yoke 16, which closes the magnetic circuit and carries the winding 15 is in an ordinary manner made from a soft-magnetic material of high permeability.

In the action of the magnetic field on the permanent magnet 12 of the movable system, as described in the previous example, there is required a symmetry which upon current interruption results in force components for raising the tonearm. This is achieved with the permanent magnet member 14. The pole piece shoe 13, which interacts with the permanent magnet 12 through an air gap, must meet certain requirements with respect to its permeability, since otherwise the required force field cannot be generted. If, for example, the magnetic resistance of the material were low, that is, the permeability were high, then there would be insufficient magnetic intensity drop along the yoke 13, and the effect on the movable system would be insufficient. Ferrite materials can provide sufficient permeability values, however. In this respect, it is to be noted that use can also be made of the permanent magnet characteristics of ferrites by, for example, cross-magnetizing the stationary magnet 14 with a south pole at the surface facing the movable magnet 12.

The field winding 15 is activated with direct current for the control of the lowering and raising of the tonearm. The direction of movement and the stylus pressure is controllable by the polarity and magnitude of the supplied direct current. This direct activating current can be easily regulated in known ways, such as with the variable resistor 18. The variable resistor 18 is, in principle, a simplified representation which in a practical design would be further supplemented with elements in known ways to form a control circuit as desired. There can also be provided automatic controls, such as for example for regulating the stylus pressure to take account of different record thicknesses or other factors which may call for a change in the stylus pressure.

The stylus pressure in the record groove is influenced by many factors which should be considered in the determination of a truly optimal value. Just as an example, it is noted that aside from the known factor of achieving a proper guiding in the groove, there also must be considered the configuration of the diamond point of the stylus and, in the case of certain manufactures, also the record press material, as well as also the unavoidable manufacturing tolerances of the tonearm system. Until now, one was limited exclusively to a compromise between the specified stylus pressure for the tonearm. In accordance with the present invention, it is possible for the first time to vary the stylus pressure in the course of the playing, and to thus make it possible to control and to set it at a truly optimum value. With the given remote control of the stylus pressure by electrical means during the playing, there can for the first time be undertaken a checking and a setting for a minimum distortion for the lateral deflections of a given groove, and pure right-left pickup from stereo records or the like. Therewith, all the factors which would otherwise not be subject to control can be included.

The pre-loading of the tonearm by a non-uniform field in the gap can, in principal, make possible the reduction or elimination of the counterweight on the tonearm, thereby further reducing its mass, if that is desired.

We claim:

1. In a record player of the type having a short tonearm having a thrust bearing means for supporting said arm from below at only a single point, said tone arm having a stylus adjacent one end and a first magnet fixed to the tonearm and interacting with a second, stationary magnet closely spaced from the first magnet, the magnets preventing sideways tilting of the tonearm in planes other than the plane containing the longitudinal axis of the axis and said single point while permitting pivoting of the arm to raise and lower the stylus, the improvement comprising:

an electrical winding about the second magnet, for generating a supplemental magnetic control field to affect in a controlled manner the interaction between the first and second magnets, and to thereby control the resultant force on the tonearm.

2. The invention claimed in claim 1 and wherein the first magnet is a short, cylindrical permanent magnet with an end face remote from the tonearm.

3. The invention claimed in claim 2, wherein the second magnet is substantially an elongated parallelepiped with a longitudinal axis along a direction generally parallel to the tonearm and with a facing surface facing the end face of the first magnet, the facing surface having a width substantially equal to the dimension of the end face of the first magnet in the same direction.

4. The invention defined in claim 3, wherein the facing surface of the second magnet is concave about a center of curvature which is substantially at the bearing point of the tonearm, so that the gap between the first and second magnets remains substantially constant as the tonearm pivots between the raised and lowered positions.

5. The invention defined in claim 3, wherein the end face of the first magnet and the facing surface of the second magnet are oriented generally non-parallel, so that the gap between the first and second magnets decreases its width as the tonearm is raised.

6. The invention defined in claim 3 and wherein the second magnet is a compound magnetic circuit with the winding being about one leg of the circuit and the facing surface of the second magnet remaining free of windings.

7. The invention defined in claim 3 and wherein at least one of the first and second magnets comprises a permanent magnet which is non-uniformly magnetized, so that the field in the gap between the first and second magnets has an intensity gradient along the direction of movement between the end face of the first magnet relative to the second magnet when the tonearm is raised and lowered.

* * * * *